(12) United States Patent
Matsushita et al.

(10) Patent No.: US 7,535,852 B2
(45) Date of Patent: May 19, 2009

(54) INFORMATION-PROCESSING DEVICE, INFORMATION-PROCESSING METHOD, AND INFORMATION-PROCESSING PROGRAM PRODUCT

(75) Inventors: Tatsuyuki Matsushita, Kawasaki (JP); Hiroshi Isozaki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 661 days.

(21) Appl. No.: 11/019,349

(22) Filed: Dec. 23, 2004

(65) Prior Publication Data

US 2005/0286437 A1    Dec. 29, 2005

(30) Foreign Application Priority Data

Jun. 25, 2004    (JP) ............................ P2004-188513

(51) Int. Cl.
*H04L 12/26* (2006.01)
(52) U.S. Cl. ......................................... 370/252; 726/27
(58) Field of Classification Search ................. 370/252, 370/389, 253, 229, 230, 235; 726/27, 3
See application file for complete search history.

(56) References Cited

U.S. PATENT DOCUMENTS

| | | | |
|---|---|---|---|
| 6,212,171 B1 * | 4/2001 | LaFollette et al. | 370/257 |
| 6,518,811 B1 * | 2/2003 | Klecka, III | 327/276 |
| 6,801,939 B1 * | 10/2004 | Chafe | 709/224 |
| 2001/0050903 A1 * | 12/2001 | Vanlint | 370/252 |
| 2002/0172158 A1 * | 11/2002 | Hoefelmeyer et al. | 370/241 |
| 2003/0198349 A1 | 10/2003 | Aizu et al. | |
| 2004/0053622 A1 | 3/2004 | Nakakita et al. | |
| 2004/0158634 A1 | 8/2004 | Saito et al. | |
| 2005/0265251 A1 * | 12/2005 | Acharya et al. | 370/252 |

FOREIGN PATENT DOCUMENTS

| | | |
|---|---|---|
| JP | 2000-278320 | 10/2000 |
| JP | 2001-285284 | 10/2001 |
| JP | 2002-300162 | 10/2002 |
| JP | 2002-312282 | 10/2002 |
| JP | 2005-45756 | 2/2005 |
| JP | 2005-269288 | 9/2005 |

* cited by examiner

*Primary Examiner*—Brenda Pham
(74) *Attorney, Agent, or Firm*—Oblon, Spivak, McClelland, Maier & Neustadt, P.C.

(57) ABSTRACT

An information-processing device for communicating with a communication device includes a RTT measurement unit configured to measure a round trip time between the information-processing device and the communication device, a RTT judgment unit configured to determine whether the round trip time exceeds a predetermined upper limit value, a unit-type information acquiring unit configured to acquire an identification of the communication device when the round trip time is not greater than the upper limit value, a limit value judgment unit configured to measure amount of cumulative information accumulated during content is transmitted to the communication device, a cumulative information storage unit configured to store the measured amount of cumulative information, and a cumulative information management unit configured to control to store the cumulative information in the cumulative information storage unit when the amount of cumulative information exceeds a given limit value.

17 Claims, 8 Drawing Sheets

| UNIT ID INFORMATION | CUMULATIVE TIME INFORMATION | RTT | RECEIVER TYPE INFORMATION | CONTENT TYPE INFORMATION |
|---|---|---|---|---|
| B | 3H | 2msec (THE NUMBER OF TESTS : 100TIMES) | TV | Mpeg-2 (24Mbps) |
| C | 5H | 4msec (THE NUMBER OF TESTS : 500TIMES) | AUDIO PLAYER | MP3 (128Kbps) |
| ... | | | | |

| UNIT ID INFORMATION | CUMULATIVE TIME INFORMATION | RTT | RECEIVER TYPE INFORMATION | CONTENT TYPE INFORMATION | ID OF THE RECEIVER | CONTENT TYPE HISTORY INFORMATION |
|---|---|---|---|---|---|---|
| B | 3H | 2msec (THE NUMBER OF TESTS:100TIMES) | TV | Mpeg-2 (24Mbps) | x-tv | Mpeg-2 Mpeg-4 (8Mbps) (24Mbps) |
| C | 5H | 4msec (THE NUMBER OF TESTS:500TIMES) | AUDIO PLAYER | MP3 (128Kbps) | y-player | MP3 MP3 (56Kbps) (320Kbps) |
| ... | | | | | | |

INFORMATION-PROCESSING DEVICE, INFORMATION-PROCESSING METHOD, AND INFORMATION-PROCESSING PROGRAM PRODUCT

CROSS REFERENCE TO RELATED APPLICATIONS

This application is based upon and claims the benefit of priority from prior Japanese Patent Application P2004-188513 filed on Jun. 25, 2004; the entire contents of which are incorporated by reference herein.

BACKGROUND OF THE INVENTION

1. Field of the Invention

The present invention relates to an information-processing device, an information-processing method, and an information-processing program product that transmits a variety of content needed to achieve copyright protection.

2. Description of the Related Art

With dissemination and digitalization of computer network in recent years, products, called as digital information electric appliances, are widely spread in use. Further, with start of ground wave digital broadcasting service, digital broadcasting-compliant televisions, STB (Set Top Box) and DVD recorders are predicted to become further widespread in the future. If these digital electric appliances are connected over a network, users are available to enjoy a variety of content via the home network with a resultant increase in utility value.

As used herein, the term "content" refers to various digital data, involving moving image data, such as MPEG2 and MPEG4, and audio data, and in addition to these, document data such as text data and still image data. Content composed of this kind of digital data is advantageous in that it can be easily copied without deteriorations, and then again, attention needs to be paid for copyright of content.

It is preferable that an area available for exchanging content, whose copyright is to be protected, is limited to a certain range, for instance, an area under a legitimate authority such as an area for private use defined under the Copyright Act or a further narrowed area. It is preferable for content to be restricted from exchanging with a third party in an area beyond such a limited range.

In the event of transmitting AV data on IP (Internet Protocol), IP has a capability of transmitting data without any physical restrictions in a cable length. Therefore, issues easily occur on a copyright law. That is, in IP, technology, a so-called VPN (Virtual Private Network) in which IP networks can be logically connected to one another in remote areas, becomes widely used. By such technology, for example, it enables to logically connect equipment in a home network of Mr. X's residence in a district A with equipment in another home network of Mr. Y' residence in another district B (physically remote from the district A) for transmitting AV data. For this reason, content in the Mr. X's residence is not closed within the home network of Mr. X's residence. Then, Mr. Y in a remote place can browse content on the network owned by Mr. X by connecting the Mr. Y's home network to Mr. X's home network.

As technique of addressing such an issue, it is conceived to measure a round trip time (RTT) between a transmitter and a receiver. The RTT is time between a time instant at which a signal is transmitted from one unit and another time instant at which the one unit to receive a reply signal from the other unit transmitting the replay signal in response to the transmitted signal.

Only under a situation where the round trip time between the transmitter and the receiver is not greater than a threshold value, the transmitter and the receiver are regarded to be present within a fixed range in terms of a distance upon which the data transmission is permitted, while preventing the data transmission and reception from remote places.

However, in the case where the round trip time is applied for the limitation, a condition of network traffic spreads the round trip time. Repeat measuring the round trip time for every transmission of data raises a problem that the transmission of data has been terminated until the round trip time is not greater than the threshold value. Therefore, another technique is proposed. In the technique, a list, which includes a datum for a receiver passing a test of the round trip time, is provided for a certain period, then the listed receiver transmits data without measurement of the round trip time, and a non-listed receiver transmits data after measurement of the round trip time. However, two problems arise in the technique. The technique requires a nonvolatile random access memory (RAM) so as to store an accumulated amount of time for transmission of the data from the transmitter even after abnormal end, such as a shut down. For the purpose of storing the accumulated amount of time accurately from a viewpoint of copyright protection, it is preferable that the accumulated amount of time is stored in the nonvolatile RAM fully. However, frequent writing of data for the accumulated amount of time in the nonvolatile RAM shortens a lifetime of the nonvolatile RAM. This is the first problem.

In the case of measuring an accumulated amount of transmitted data instead of time, there are various durations for holding the list in accordance with bit rate, such as low bit rate content, for example, audio data, or high bit rate content, for example, high-definition moving image data. Therefore, it is hard to predict that the accumulated amount of time approaches the limitation, and re-measurement is required for passing the test to transmit next content after the accumulated amount of time exceeds the limitation without re-measurement. The re-measurement preceding the transmission of content prevents quick transmission of the content. Particularly, low frequency of writing for solving the first problem causes extreme increase of amount of time added to the accumulated amount of time. Consequently, the accumulated amount of time may exceed the limitation during transmission of data before the re-measurement. This is the second problem.

SUMMARY OF THE INVENTION

The present invention is invented to solve the problems mentioned above. The present invention provides an information processor, an information-processing method, and an information-processing program product for contributing to a long lifetime of product and usability.

An aspect of the present invention inheres in an information-processing device for communicating with a communication device including a RTT measurement unit configured to measure a round trip time between the information-processing device and the communication device, a RTT judgment unit configured to determine whether the round trip time exceeds a predetermined upper limit value, a unit-type information acquiring unit configured to acquire an identification of the communication device when the round trip time is not greater than the upper limit value, a limit value judgment unit configured to measure amount of cumulative information accumulated during content is transmitted to the communication device, a cumulative information storage unit configured to store the measured amount of cumulative information, and a cumulative information management unit configured to control to store the cumulative information in the cumulative information storage unit when the amount of cumulative information exceeds a given limit value.

Another aspect of the present invention inheres in an information-processing program product for communicating with a communication device, comprising, instructions for measuring a round trip time between the information-processing device and the communication device, instructions for determining whether the round trip time exceeds a predetermined upper limit value, instructions for acquiring an identification of the communication device when the round trip time is not greater than the upper limit value, instructions for measuring amount of cumulative information accumulated during content is transmitted to the communication device, instructions for storing the measured amount of cumulative information, and instructions for controlling to store the cumulative information when the amount of cumulative information exceeds a given limit value.

Still another aspect of the present invention inheres in an information-processing method for communicating with a communication device including measuring a round trip time between the information-processing device and the communication device, determining whether the round trip time exceeds a predetermined upper limit value, acquiring an identification of the communication device when the round trip time is not greater than the upper limit value, measuring amount of cumulative information accumulated during content is transmitted to the communication device, storing the measured amount of cumulative information, and controlling to store the cumulative information when the amount of cumulative information exceeds a given limit value.

DETAILED DESCRIPTION OF EMBODIMENTS

Hereinafter, one embodiment of the present invention is described with reference to the accompanying drawings.

First Embodiment

Figure 1:
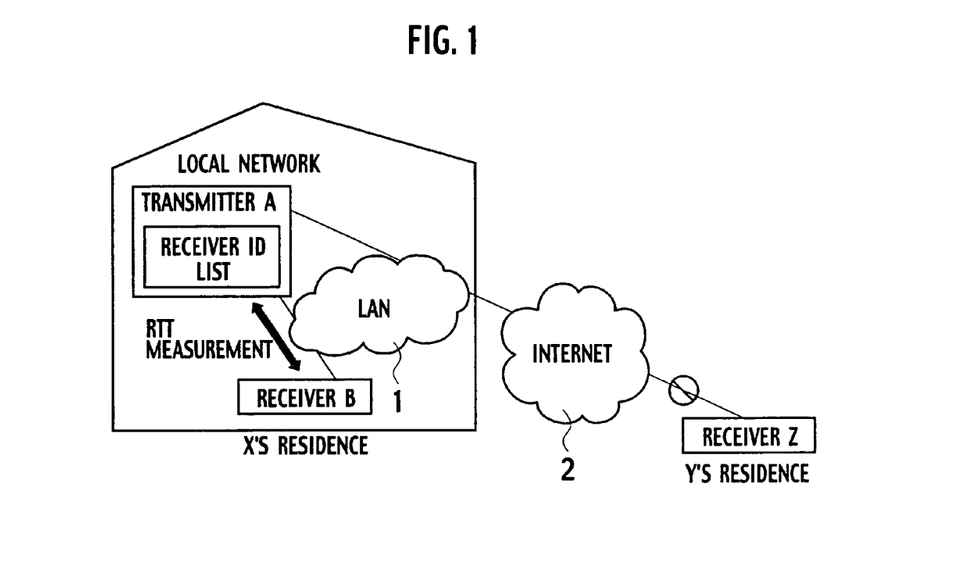
FIG. 1 is a block diagram showing one example of an overall structure of an information communicating system of a first embodiment according to the present invention.

FIG. 1 is a block diagram showing an overall structure of an information communication system, equipped with an information-processing device, of a first embodiment according to the present invention. The information communication system, shown in FIG. 1, is comprised of a transmitter A and a receiver B, both connected to a local area network 1 located in a MR. X's residence, and a receiver Z located outside the residence (in Mr. Y's residence) and connected to the local area network 1 via an Internet 2. The transmitter A, shown in FIG. 1, corresponds to, for instance, the information processing device of one embodiment according to the present invention.

In FIG. 1, the receiver Z, connected to the Internet 2, and the local area network 1 may be connected through routers that are not shown.

As physical layers and link layers for the local area network 1, a variety of forms may be undertaken, which include a radio LAN, based on IEEE802.11, Ethernet (Registered Trade Mark) and IEEE1394. Under situations where Internet Protocol (IP) is used as a network layer of the local area network 1, it may be sufficed for IPv4 or IPv6 to be used. Also, although other units than the transmitter A and the receiver B may be connected to the local area network 1, these other units are omitted herein for the sake of simplicity.

As used herein, the term "content" refers to moving picture data such as, for instance, MPEG2 and MPEG4, voice data such as MP3, or digital content such as text data and image data. Here, for the sake of simplicity in description, description is made of the transmission of digital content (hereinafter merely referred to as content) to be transmitted under copyright protection.

Consider a situation where content is transmitted from the transmitter A to the receivers B, Z. At this time, the point to be noted is copyright protection for content. As set forth above, an area available for relevant content to be exchanged is limited to a certain range, for instance, within a legitimate authority area, such an area defined under the Copyright Act for private use, or limited to an area that is further narrower than the above area, and it is preferred for content to be inhibited from exchange with other persons beyond the limit of such areas.

That is, it is realized that the transmission and reception of content is permitted between the transmitter A and the receiver B within the Mr. X's residence but content is not transmitted to the receiver Z placed in an area outside the Mr. X's residence. As a method of limiting a distribution range to a certain distribution area, the presently filed embodiment contemplates to incorporate a mechanism by which round trip time (RTT) between the associated transmitter and receiver is measured and, only when the measured round trip time is not greater than a threshold value, the relevant transmitter and receiver are regarded to be present in a certain distant area whereupon the transmission of content is permitted.

Figure 2:
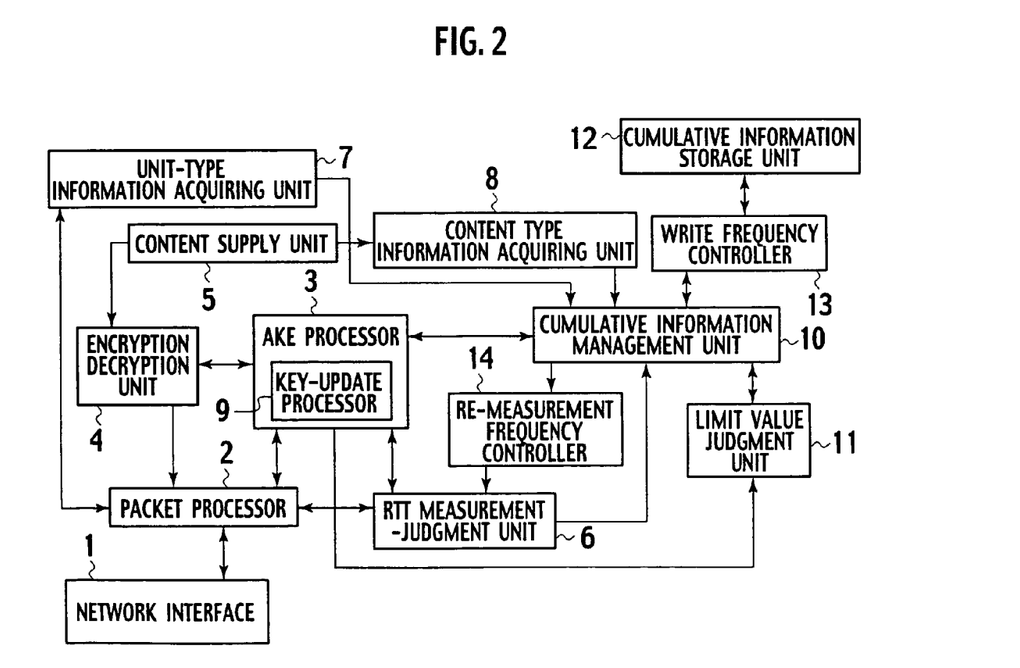
FIG. 2 is a block diagram showing one example of an internal structure of a transmitter A.

FIG. 2 is a block diagram illustrating one example of an internal structure of the transmitter A. As shown in FIG. 2, the transmitter A is comprised of a network interface 1, a packet processor 2, an authentication key exchange (AKE) processor 3, a code processor 4, a content supply unit 5, a RTT measurement-judgment unit 6, a unit-type information acquiring unit 7, a content type information acquiring unit 8, a cumulative information management unit 10, a limit value judgment unit 11, a cumulative information storage unit 12, a write frequency controller 13 and a re-measurement frequency controller 14.

The network interface 1 executes physical layer processing as well as data link layer processing to enable communication with the receiver B. The packet processor 2 executes network layer and transport layer processing for communication with the receiver B.

The authentication key exchange processor 3 executes authentication key exchange processing with respect to the receiver B. The authentication key exchange processor 3 includes a key-update processor 9. The key-update processor 9 serves to update a key, for use in encrypting content, based on a time interval, for which content is transmitted to the receiver, or a volume of transmitted data upon which the updated key is notified to the code processor 4 while permitting key update information, indicative of the key being updated, to be notified to the limit value judgment unit 11.

The code processor 4 encrypts content to be transmitted. The content supply unit 5 stores content for supply to the packet processor 2. The RTT measurement-judgment unit 6 measures the round trip time, between the transmitter and the receiver, and determines whether the measured round trip time exceeds a predetermined upper limit value. The unit-type information acquiring unit 7 acquires information of a type of a communication unit (communication device) detected during discovery of the unit or during content request. The content type information acquiring unit 8 acquires content type information, such as a bit rate, of content when receiving content request.

The cumulative information management unit 10 manages cumulative time information, calculated based on identifying information of the receiver, or key update information notified from the limit value judgment unit 11 via the key-update processor 9. Cumulative time information is generated from the key-update processor 9 or the limit value judgment unit 11. Cumulative time information forms one of cumulative information. Cumulative information may include, in addition to cumulative time information, cumulative time for which content is transmitted, an accumulated amount of volumes of transmitted data in cases where cumulative time are measured upon conversion into transmitted data volumes, or a value of a counter value that cumulatively counts a frequency of events in cases where the cumulative time is converted to the frequency of events that could occur at a fixed time interval or at a fixed data-volume transmission interval during the transmission of content. The limit value judgment unit 11 notifies the cumulative information management unit 10 with key update information notified from the key update processor 9 and discriminates whether cumulative time information, registered in the cumulative information management unit 10, exceeds an upper limit value. The cumulative information storage unit 12 stores information, registered in the cumulative information management unit 10, in a non-volatile RAM. The non-volatile RAM is, for instance, a flash memory. The write frequency controller 13 determines a frequency of writing cumulative time information to the cumulative information storage unit 12 based on communication-unit type information or content type information. The re-measurement frequency controller 14 controls a frequency of re-measuring the round trip time with respect to the receiver based on cumulative time information, registered in the cumulative information management unit 10, communication-unit type information or content type information.

Figure 3:
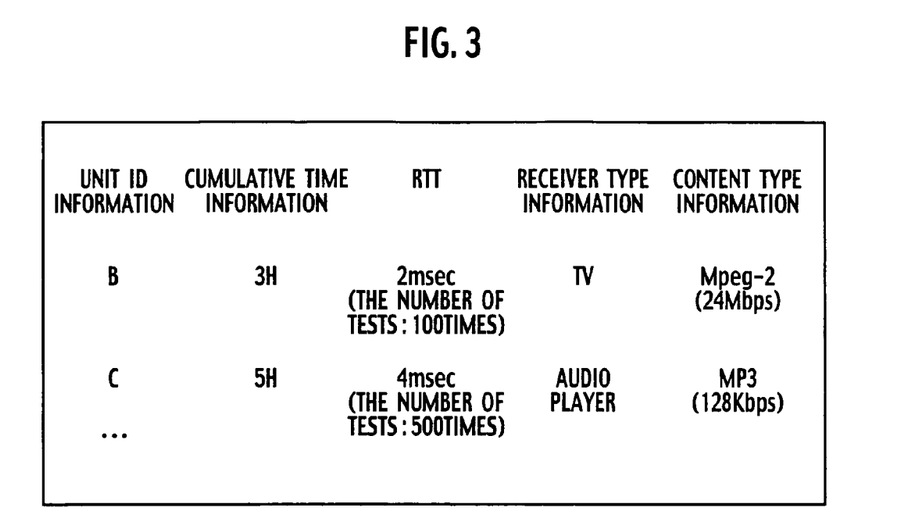
FIG. 3 is a view illustrating one example of a receiver information list stored in a cumulative information management unit 10.

FIG. 3 is a view illustrating one example of a receiver information list stored in the cumulative information management unit 10. The receiver information list includes unit-identification information, related to the receiver whose round trip time measured value is not greater than a predetermined upper limit value (which has passed a round trip time test), cumulative time information for which content is transmitted, the round trip time (RTT) measured value, receiver type information and content type information. The cumulative time may also be converted to a transmission data volume for measurement of time. That is, the key-update processor 9 or the limit value judgment unit 11 may measure an accumulated amount of the transmission data volume and, in such a case, the accumulated amount of the transmission data volume is registered in the receiver information list of the cumulative information management unit 10. Further, the cumulative time can be converted to an event frequency that could occur at a fixed time interval or at a fixed data-volume transmission interval during the transmission of content. That is, the key-update processor 9 or the limit value judgment unit 11 may measure an accumulated number of event frequency and, in such a case, the accumulated number of event frequency is registered in the receiver information list of the cumulative information management unit 10.

If discrimination is made by the limit value judgment unit 11 that content has been transmitted to the receiver during cumulative time beyond a predetermined upper limit value, unit-identification information of the relevant receiver is deleted from the receiver information list. At least unit-identification information and cumulative time information are written to the cumulative information storage unit 12 that has non-volatile RAM storage areas.

Figure 4:
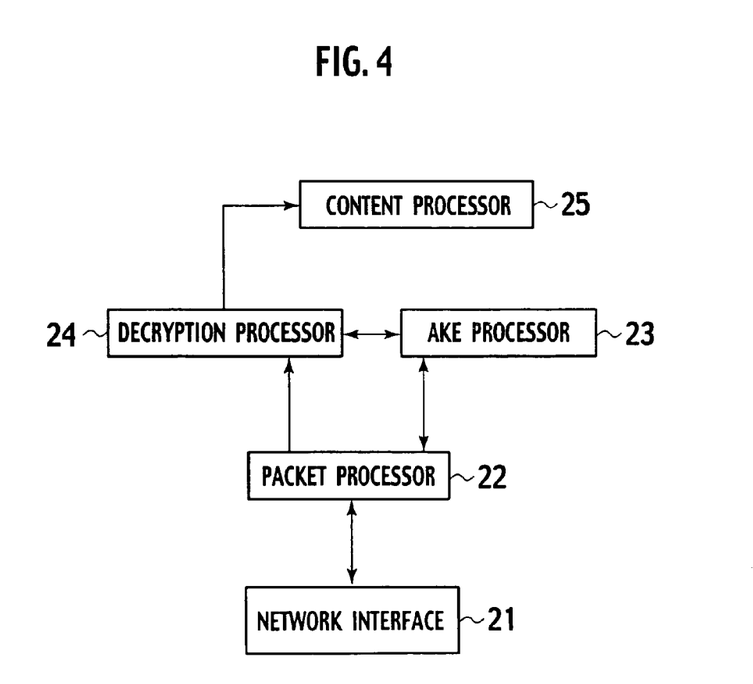
FIG. 4 is a block diagram showing one example of a receiver B.

FIG. 4 is a block diagram illustrating one example of an internal structure of the receiver B. As shown in FIG. 4, the receiver B is comprised of a network interface 21, a packet processor 22, an authentication key exchange unit 23, a decryption processor 24 and a content processor 25. The network interface 21 executes physical layer processing as well as data link layer processing to enable communication with the transmitter A. The packet processor 22 executes network layer and transport layer processing for communication with transmitter A. The authentication key exchange unit 23 executes authentication key exchange (AKE) operation with the transmitter A. The decryption processor 24 decrypts received content. The content processor 25 executes operations to allow received content to be outputted to a display device or to allow received content to be stored. Also, the content processor 25 executes operation to allow received content to be outputted to the display device or the received content to be stored. Also, the network interface 21, the packet processor 22 and authentication key exchange unit 23 may have the same structures as those of the transmitter A, respectively.

As used herein, the term "authentication key exchange (AKE) processing" refers to the operation in that the transmitter, the receiver and the short-range radio unit X are permitted to execute the authentication with respect to one another about whether they correctly have a license from a certain Licensor Organization whereupon, when these units are recognized as legitimate units, a shared key is generated.

Authentication methods may include a well-known method such as ISO/IEC 9798-2 and ISO/IEC 9798-3. Also, the code processor 4 and the decryption processor 24 have functions to encrypt and decrypt content using the shared key by the execution of the authenticating operation and a code algorism for encrypting and decrypting these data may include a well-known method such as AES.

Figure 5:
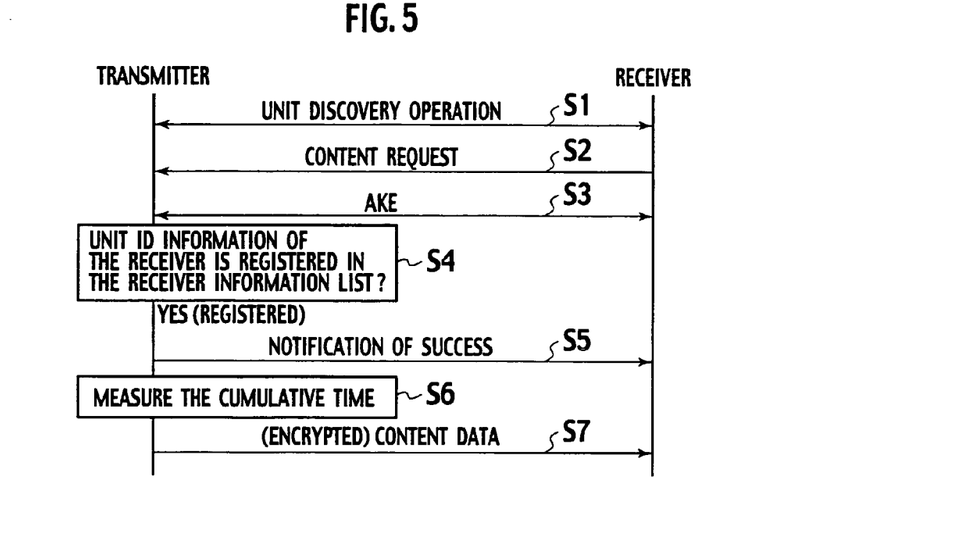
FIG. 5 is a sequence diagram showing one example of an operating sequence for content transmitting operation to be executed when transmitting AV content from the transmitter A to the receiver B.

FIG. 5 is a sequence diagram illustrating one example of an operating sequence of content transmitting operation to be executed when transmitting AV content from the transmitter A to the receiver B. First, unit discovery operation is executed between the transmitter A and the receiver B for permitting the transmitter A to acquire unit type information of the receiver B (step S1). When using UPnP and SSDP as protocols for acquiring unit type information, the receiver B transmits information, distinguishing the type of a communication unit (such as MPEG2 HD compatible decoder and MP3 decoder or the like) and containing one entry of a device description, to the transmitter A and, upon receipt of that information, the transmitter A acquires unit type information. Unit type information may be acquired during discovery of the units or during transmission of content request and, when using HTTP as a content transmission protocol, a method of notifying unit type information from the receiver B to the transmitter A may include a process, in which a dedicated field is defined as one entity of an HTTP Request header for notification, and another process in which an HTTP GET Request is contained in URL for notification. The receiver B transmits content request to the transmitter A (step S2). In response to this request, the transmitter A and the receiver B execute AKE processing with respect to one another (step S3).

If AKE processing is normally completed and the key is shared between the transmitter A and the receiver B, the transmitter A checks whether unit-identification information of the receiver B is registered in a receiver information list (step S4). Upon a success in this check, the transmitter A transmits a message to the receiver B with notification of a success in the check operation (step S5) and, thereafter, the transmitter A acquires cumulative time information from the receiver information list to begin the measuring of cumulative time (step S6) while commencing to transmit content data (step S7).

Also, although this exemplary case has been shown with respect to an aspect where content request is followed by the execution of AKE operation, the AKE operation and check operation, as to whether unit-identification information of the receiver B is registered in the receiver information list, may be executed prior to making content request. When acquiring content type information, the transmitter A acquires content type information (for instance, a codec such as MPEG2 or the like and a bit rate of content) from content required when making content request. As an example, description will be made of a method of acquiring the bit rate of content. The transmitter acquires the bit rate by referring to a field (a field indicative of the bit rate of content defined in a system header in case of, for instance, MPEG2-PS) defined for each multiplexed system such as MPEG2-PS or the like. Also, in cases where metadata of content is preliminarily prepared, the bit rate of content may be acquired by referring to the associated metadata.

Figure 6:
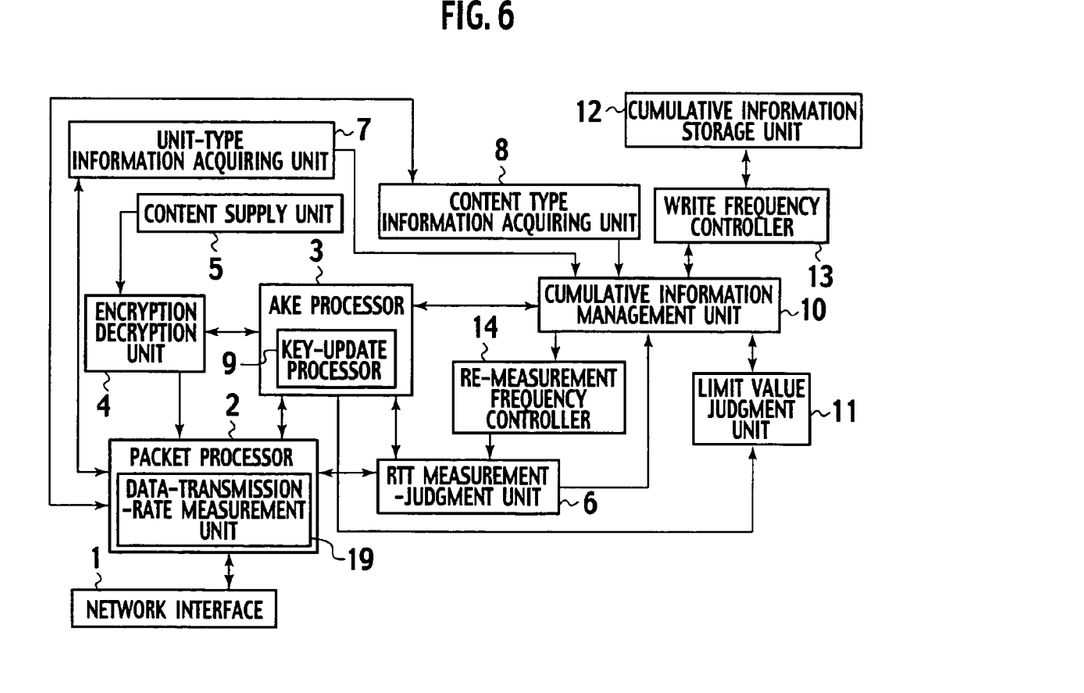
FIG. 6 is a block diagram showing a modified form of the internal structure of the transmitter S.

While the foregoing has been described in conjunction with the example in which content type information is acquired when making content request, the bit rate of content may be acquired by measuring data transmission rate during the transmission of content. In this case, the transmitter A may have an internal structure as shown in FIG. 6. As shown in FIG. 6, the packet processor 2 of the transmitter A includes a data-transmission-rate measurement unit 19. The data-transmission-rate measurement unit 19 measures a data transmission rate and the resulting measured value is notified to the content type information acquiring unit 8 as a bit rate of content.

Figure 7:
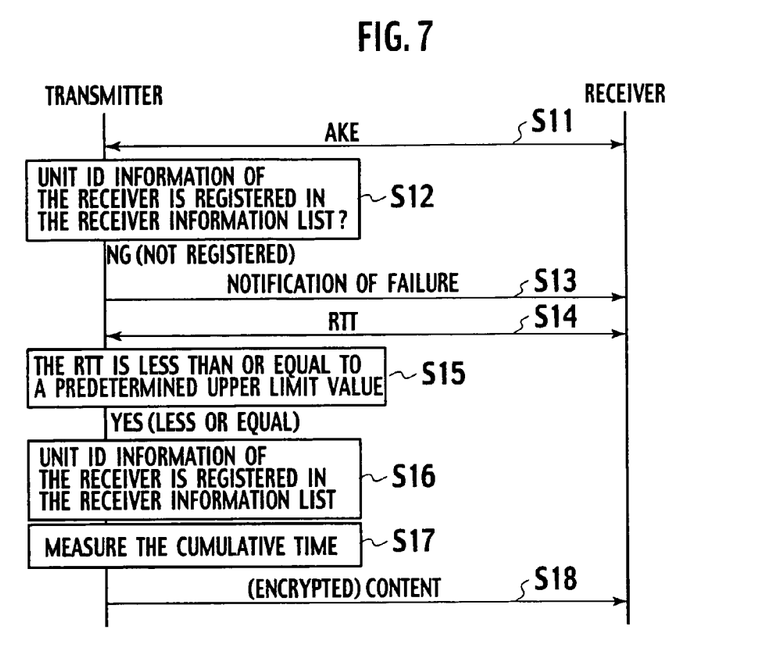
FIG. 7 is a sequential diagram showing an operating sequence under a situation in which the transmitter A fails in check operation as to whether unit-identification information of the receiver B is registered in a receiver information list.

FIG. 7 shows an operating sequence in an event that the transmitter A fails in the check operation as to whether unit-identification information of the receiver B is registered in the receiver information list. The same operations as those shown in FIG. 5 are executed until steps of executing unit discovery operation, content request and AKE operation (step S11).

Subsequently, the transmitter A checks whether unit-identification information of the receiver B is registered in the receiver information list (step S12). Upon the occurrence of a failure in this check, the transmitter A notifies the receiver B with a message notifying the failure in the check operation (step S13) and measures the round trip time (RTT) associated with the receiver B (step S14).

If discrimination is made that the measured round trip time is not greater than a predetermined upper limit value (step S15), unit-identification information of the receiver B is registered in the receiver information list (step S16) and the measuring of the cumulative time (step S17) is commenced while beginning the transmission of content (step S18).

Figure 8:
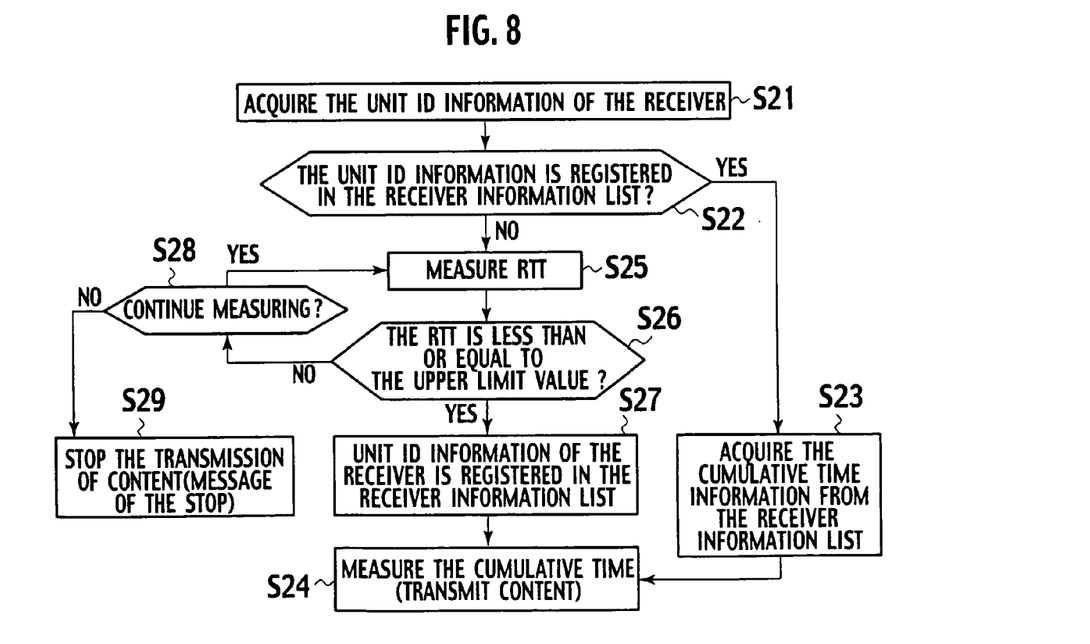
FIG. 8 is a flowchart of measuring and discriminating operation for round trip time.

FIG. 8 is a flowchart for round trip time measuring and discriminating operation. As set forth above, after the transmitter A acquires unit-identification information of the receiver B (step S21), the transmitter A checks whether relevant unit-identification information of the receiver B is registered in the receiver information list (step S22).

If unit-identification information of the receiver B is registered in the receiver information list, this means that the round trip time between the transmitter A and the receiver B, measured in the past, is not greater than the predetermined upper limit value and content-transmission cumulative time with respect to the receiver B still does not exceed the predetermined upper limit value, and the transmission of content is permitted without re-measuring the round trip time. When this takes place, cumulative time information, in which content has been transmitted to the receiver B in the past, is acquired from the receiver information list (step S23), and the operation is executed to add a content transmission time, which is currently measured, to that cumulative time (step S24).

In contrast, if unit-identification information of the receiver B is not registered in the receiver information list, this means that no round trip time between the transmitter A and the receiver B is measured in the past or content-transmission cumulative time in respect of the receiver B exceeds the predetermined upper limit value during preceding transmission, and the transmitter A requests re-measuring of the round trip time (step S25).

Here, if the resulting re-measured value is not greater than the predetermined upper limit value (step S26), the transmitter A registers unit-identification information of the receiver B in the receiver information list (step S27) to begin the measuring of the cumulative time while commencing to transmit content (step S24).

If the resulting re-measuring value of the above-described round trip time continuously exceeds the predetermined upper limit value, discrimination is made whether to continue the re-measuring (step S28) and if the measuring is not continued, the operation may be executed to transmit a message to the receiver B with a notice to stop the transmission of content (step S29).

Figure 9:
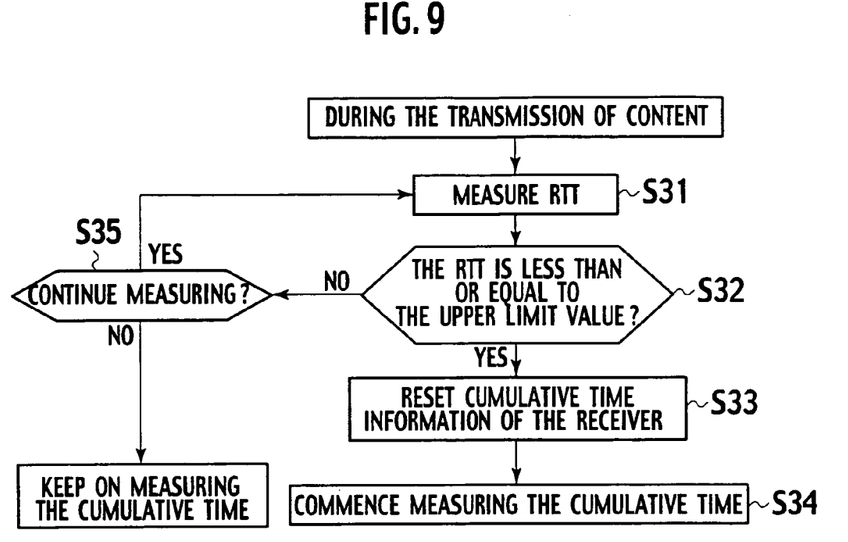
FIG. 9 is a flowchart showing one example of measuring and discriminating operation for round trip time under a situation where the round trip time is measured during the transmission of content.

FIG. 9 is a flowchart showing one example of the round trip time measuring and discriminating operation in cases where the round trip time is measured during the transmission of content. The round trip time is measured during the transmission of content (step S31) and discrimination is made whether the resulting measured value is not greater than the predetermined upper limit value (step S32), whereupon if the measured value is not greater than the upper limit value, the transmitter A resets cumulative time information of the receiver B registered in the receiver information list (step S33) and commences measuring the cumulative time of the transmission of content a new (step S34).

With respect to the timing at which cumulative time information is reset, cumulative time information of the receiver B may not be reset immediately after discrimination is made that the measured value of the round trip time is not greater than the predetermined upper limit value but may be reset when subsequent cumulative time information is updated. As another alternative, flag information, indicative of the presence of discrimination that the measured value of the round trip time is not greater than the predetermined upper limit value, may be stored to allow cumulative time information of the receiver B to be reset.

In step S32, if discrimination is made that the measured value is greater than the upper limit value, then, judgment is made whether to continue the measuring (step S35) and, if the measuring is continued, the operation is routed back to step S31.

Figure 10:
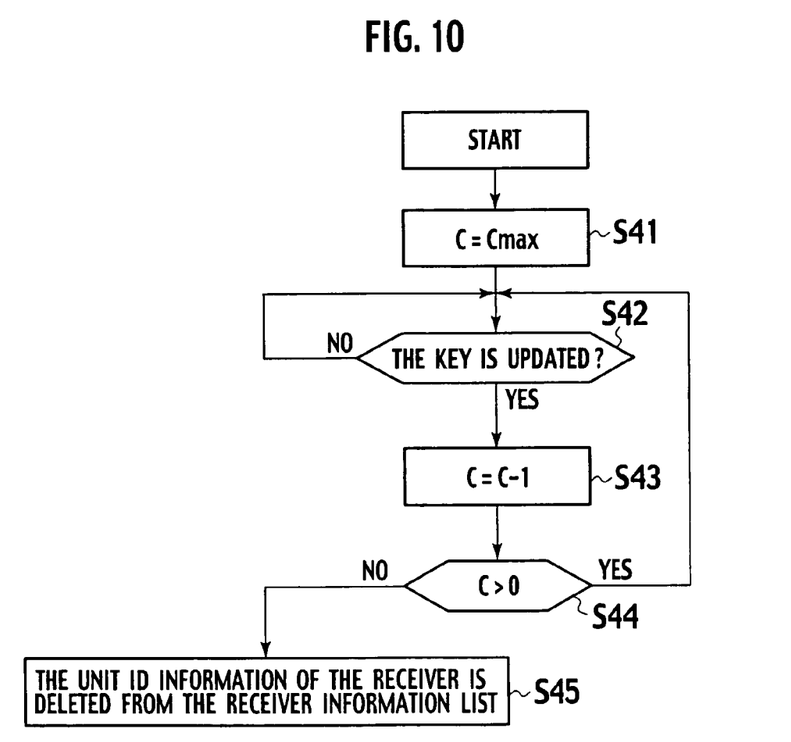
FIG. 10 is a flowchart showing one example of cumulative time measuring and discriminating operation under a situation where content is transmitted to the receiver.

FIG. 10 is a flowchart showing one example of cumulative time measuring and discriminating operation to be executed when transmitting content to the receiver. The embodiment is described below with reference to a case wherein, during the transmission of content, the measuring is made based on events that occur at a fixed time interval or at a fixed data-volume transmission interval. As for an example of the event, description is made of an example in which the measuring is conducted by updating a time variable key for use in encrypting content.

Suppose that an upper limit value of a time variable key updating count, corresponding to a predetermined cumulative time upper limit value, is Cmax and a residual time variable key updating count of the receiver B registered in the receiver information list is C (step S41). The residual time variable key updating count C is a value resulting from Cmax from which the time variable key updating count is subtracted thus far and, in this case, the residual time variable key updating count C corresponds to cumulative time information.

When the time variable key is updated during the content is transmitted to the receiver B (step S42), the transmitter A decrements a value of the residual time variable key updating count C, registered in the receiver information list, by one (step S43).

Discrimination is made whether the value C is greater than zero (step S44) and if greater than zero, the receiver information list is held intact and the operation is routed back to step S42. With the value C reached zero, unit-identification information of the receiver B is deleted from the receiver information list (step S45).

In such a case, the transmission of content is inhibited unless the re-measuring is conducted for the round trip time between the transmitter A and the receiver B.

Figure 11:
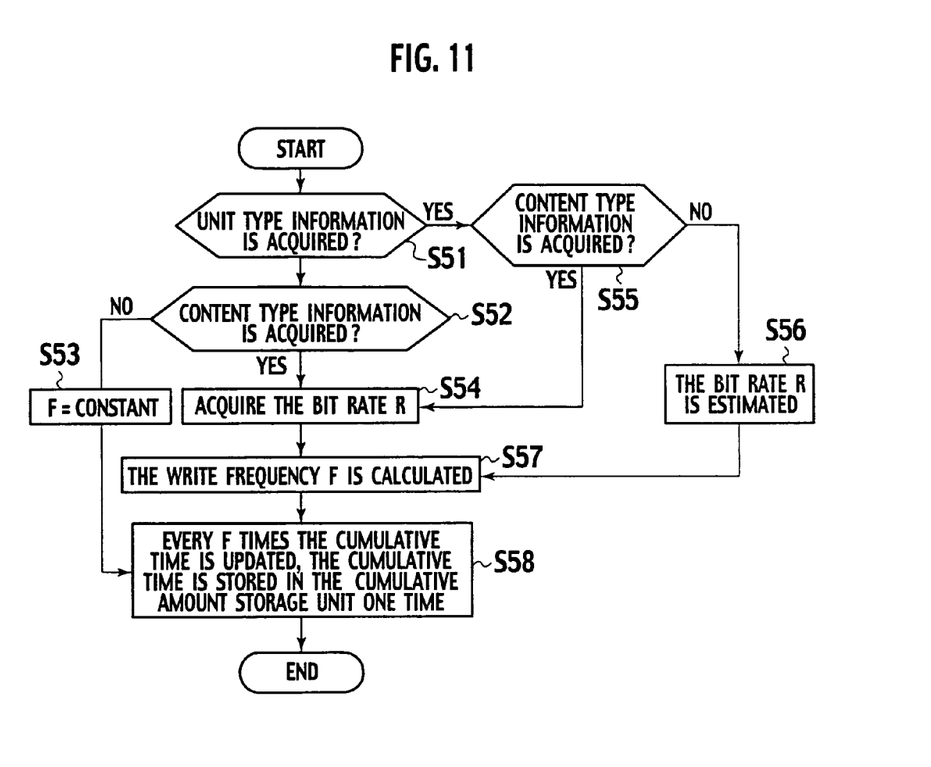
FIG. 11 is a flowchart showing one example of write frequency control operation for controlling a frequency of writing updating information of cumulative time information to a storage area of a non-volatile memory area of a cumulative information storage unit.

FIG. 11 is a flowchart showing one example of write frequency control operation for controlling a frequency in which updating information of cumulative time information, forming one element of the receiver information, stored in the cumulative information management unit 10 of the transmitter A is written to a memory area of a non-volatile RAM. Like in the description made with respect to FIG. 10, description is made of an example wherein the measuring is conducted based on a frequency in which the time variable key for use in encrypting content is updated.

Write frequency control is conducted based on communication-unit type information (hereinafter referred to as unit type information) or content type information. As used herein, the term "write frequency F" is defined as a parameter that represents control so as to execute the writing to the cumulative information storage unit 12 one time every time the cumulative time information of the receiver information is updated at F frequencies. The transmitter A discriminates whether unit type information is acquired (step S51). If no unit type information is acquired, then, discrimination is made whether content type information is acquired (step S52). If no content type information is acquired in step S52, the operation is executed to set a predetermined constant as a value of the write frequency F (step S53). If content type information is acquired in step S52, the operation is executed to acquire the bit rate (step S54).

If content type information is acquired in step S51, discrimination is made whether content type information is acquired (step S55). If content type information is acquired in step S55, the bit rate is acquired (step S54). If no content type information is acquired in step S55, the bit rate is estimated from unit type information (step S56).

Upon acquiring or estimating the bit rate, the write frequency F with respect to the cumulative information storage unit 12 is calculated (step S57). The write frequency F is expressed by a formula (1).

$$F = 365 \times 24 \times 3600 \times LRS/(DW) \tag{1}$$

Here, L is an expected lifetime the cumulative information storage unit 12; R is a bit rate [MB/sec] of content to be transmitted; S is the number of receivers available for content to be transmitted at the same time; D is a frequency [MB/times] of updating a time variable key, which indicates a frequency of measuring the cumulative information; and W is a durable write frequency. For each updating cumulative time information in the receiver information list F number of times based on a calculated value, the control is executed to write the same to the cumulative information storage unit 12 one time (step S58).

When transmitting content with a high bit rate, such as high resolution motion picture data, the degree of frequency, in which the time variable key is updated, increases and, if the writing is made to the non-volatile RAM of the cumulative information storage unit 12 whenever cumulative time information is updated in the receiver information list, frequent writings are executed within a short period of time, resulting in wasteful reduction in the durable write frequency of the non-volatile memory. Further, when transmitting content, such as music data with a low bit rate, the degree of frequency of updating the time variable key decreases and, if the writing to the non-volatile RAM of the cumulative information storage unit 12 is executed at the same frequency as that of high resolution motion picture data, a writing time interval excessively increases, causing an inability of obtaining proper cumulative time to occur during sudden power-off with a resultant issue of copyright protection.

Like in the presently filed embodiment, performing adaptive write frequency control depending on the bit rate of content to be transmitted enables the non-volatile RAM to have an elongated life with attention to copyright protection.

Also, though in the foregoing example, updating information of cumulative time information is loaded to the cumulative information storage unit 12, for the purpose of response to sudden power-off, a value (which, in the example shown in FIG. 10, corresponds to a value obtained by decrementing the updated residual time variable updating count C by one), in which updating information is preliminarily updated by an extra value, may be loaded to the cumulative information storage unit 12.

Figure 12:
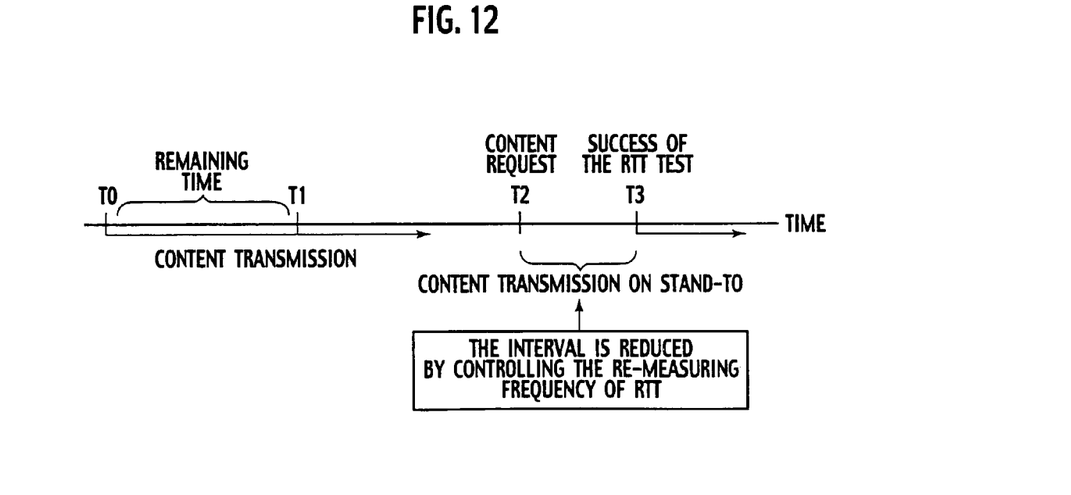
FIG. 12 is a view for illustrating a need for controlling a frequency in which the round trip time between the transmitter A and the receiver B is re-measured.

FIG. 12 is a view for illustrating a need for controlling a frequency required for re-measuring the round trip time between the transmitter A and the receiver B. Suppose that a time, in which content is transmitted from the transmitter A to the receiver B at certain time T0 and the content transmission is continuously held intact to allow the cumulative time for the content transmission to exceed the predetermined upper limit value, is T1.

If content is continuously transmitted after time T1 without re-measuring the round trip time, then, the transmitter A needs to re-measure the round trip time with respect to the receiver B, as shown in FIG. 7, when subsequently receiving content request from the receiver B (suppose to be at time T2). Since the transmitter A is unable to transmit content to the receiver B unless the re-measuring of the round trip time is completed, the content transmission is enabled at time T3 or later when the measuring of the round trip time is terminated.

This time T3 depends on a topology and a traffic of the network between the transmitter A and the receiver B and, therefore, a probability occurs wherein after transmission request happens from the receiver B, a more wait time T3-T2 is needed before content is actually transmitted from the transmitter A. The "more wait time T3-T2" means that a longer wait time is needed before a user is available to actually receive content from time at which the user wants to receive content, resulting in deterioration in easy-to-use service for the users. To prevent the occurrence of such issues, there is a need for controlling the re-measuring frequency of the round trip time.

Figure 13:
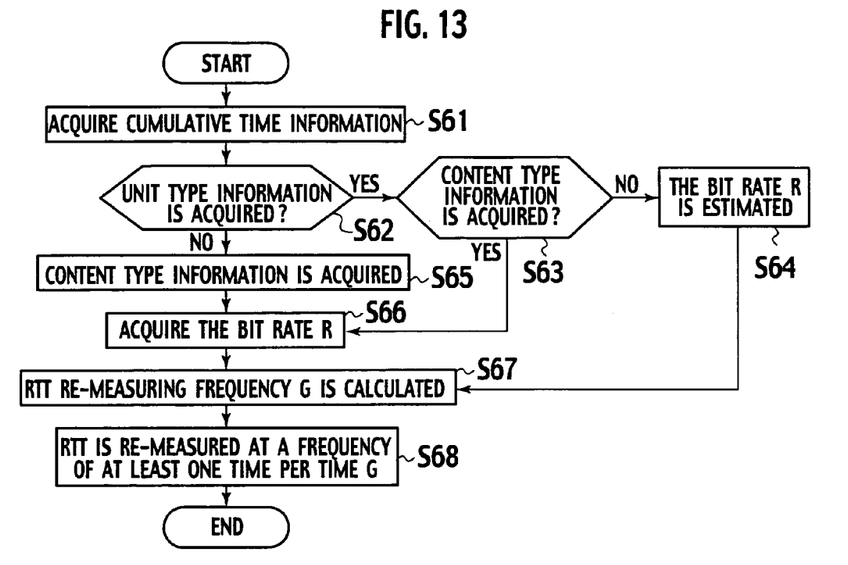
FIG. 13 is a flowchart showing one example of round trip time re-measuring frequency control operation for controlling a frequency in which the round trip time between the transmitter A and the receiver B is re-measured.

FIG. 13 is a flowchart showing one example of round trip time re-measuring frequency control operation for controlling a frequency in which the round trip time between the transmitter A and the receiver B is re-measured. Like in description of FIG. 10, description is made with reference to an example where the measuring is made in terms of the number of times in which the time variable key for use in encrypting content is updated.

The round trip time re-measuring frequency control is executed based on the time variable key updating count C of the receiver B, registered in the receiver information list, and communication-unit type information or content type information. The transmitter A acquires cumulative time information, that is, the time variable key updating count C, from the receiver information list of the cumulative information management unit (step S61).

Next, the transmitter A estimates or acquires the bit rate R of content to be transmitted from unit type information or content type information like in the operations in steps S52 to S56 in FIG. 11 (step S62 to S66).

Consecutively, a round trip time re-measuring frequency G is calculated based on a formula (2) (step S67).

$$G=CD/(QR) \qquad (2)$$

Here, C is the residual time variable key updating count of the receiver B; D is a frequency [MB/times] of updating the time variable key, which indicates amount of the cumulative information; Q is the number of measurement times required for successes in preceding round trip time test, that is, the number of measuring the round trip time before obtaining the round trip time not greater than the upper limit value; and R is a bit rate [MB/sec] of content to be transmitted.

Based on a value calculated on the formula (2), the round trip time is re-measured at a frequency of at least one time per second of G (step S68). Performing the round trip time re-measuring frequency control in such a way addresses the issues described with reference to FIG. 12. That is, it becomes possible to address the issues in which the cumulative time reaches the upper limit value during the transmission of content before the round trip time is re-measured. Accordingly, content can be rapidly transmitted without a need to re-measure the round trip time during subsequent transmission of content.

Also, a value of Q may be expressed as the number of measurement times needed for the measured value, in a preceding round trip time measurement, registered in the receiver information list, like in the example set forth above, or may include a predetermined fixed value.

With the examples shown in FIGS. 11 and 13, through the write frequency control and round trip time re-measuring frequency is carried out based on communication-unit type information or content type information, another alternative may be implemented in an aspect wherein content type information of content, which has been previously transmitted, is registered to allow the content classification, which is subsequently transmitted, to be predicted based on that history information so as to control the degree of frequency, in which the writing is made to the non-volatile RAM, and the round trip time re-measuring frequency in the same manner.

Further, if each write sector of a write area in the non-volatile RAM becomes close to the end of writable life, the other sector may be used. Or, control may be executed for selecting the write areas such as averagely using all sectors. Additionally, identifications of units of the receivers, such as names of products, and cumulative time information may be displayed to allow the users to enable the re-measuring of the round trip time. In this case, a schematic structure of the transmitter A is configured as shown in FIG. 14 and the receiver information list of the cumulative information management unit of the transmitter A is as shown in FIG. 15.

Figure 14:
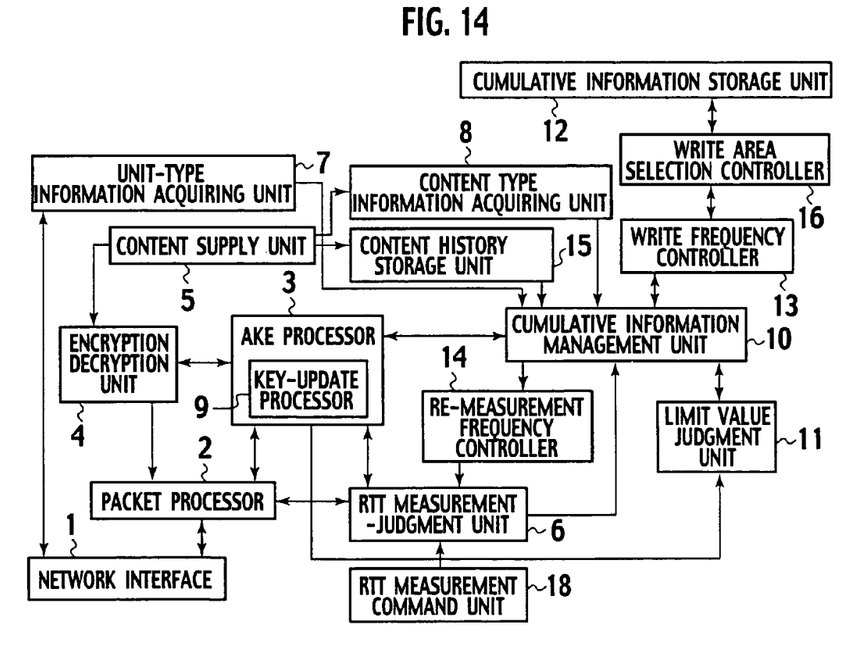
FIG. 14 is a block diagram showing a modified form of the transmitter A.
Figure 15:
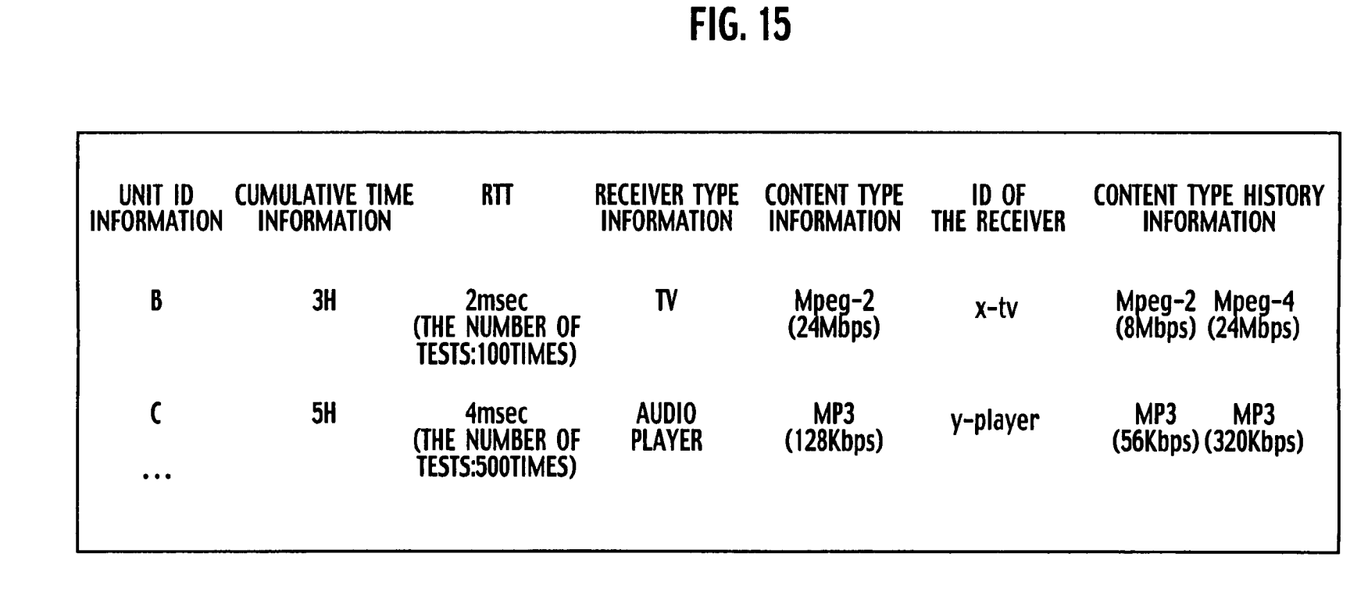
FIG. 15 is a view illustrating the receiver information list corresponding to that of FIG. 14.

The transmitter A, shown in FIG. 14, includes, in addition to the structure shown in FIG. 2, a content history storage unit 15 that stores history information of content that is previously transmitted, a write area selection controller 16 for selecting a write area inside the cumulative information storage unit 12, a cumulative time display unit 17 that provides a display of cumulative time for which content is transmitted, and a RTT measurement command unit 18 that commands manually executing the measuring for the round trip time.

Thus, with the presently filed embodiment, since the frequency of writing to the cumulative information storage unit 12 is controlled depending on the kind of content or the number of receivers, a life of the non-volatile RAM, forming the cumulative information storage unit 12, can be elongated as long as possible.

Further, with the presently filed embodiment, since the frequency of re-measuring the round trip time is calculated based on cumulative time, the frequency of updating the cumulative time, the number of times, in which the round trip times are measured until a test for the round trip time is successful, and the bit rate of content, no troubles occur wherein the cumulative time increases in excess to cause the cumulative time to reach the upper limit value without remeasuring the round trip time, enabling content to be immediately transmitted during subsequent transmission of content.

The information processing devices, set forth above with reference to the embodiments set forth above, may be embodied in hardware or software. When embodied in software, a program code that realizes at least part of functions of the information processing device may be recorded in record media, such as floppy discs and CD-ROMs to allow a computer to read and execute the same. The record media may not be limited to those, such as magnetic discs and optical discs, which are portable, and may include stationary type record media such as hard disc drives and memories.

Further, a program that realizes at least a part of functions of the information processing device may be distributed over communication line (inclusive of radio communication) such as Internet or the like. In addition, under a status wherein such a program is encrypted, modulated or compacted, the program may be distributed via a cable line or radio line, such as Internet or the like, or in the form of record media.

What is claimed is:

1. An information-processing device for communicating with a communication device, comprising:
   a RTT measurement unit configured to measure a round trip time (RTT) between the information-processing device and the communication device;
   a RTT judgment unit configured to determine whether the round trip time measured by the RTT measurement unit exceeds a predetermined upper limit value, and put a restriction on the communication with the communication device if the round trip time exceeds the predetermined upper limit value;
   a unit-type information acquiring unit configured to acquire an identification of the communication device when the round trip time is not greater than the predetermined upper limit value;
   a limit value judgment unit configured to measure an amount of cumulative information accumulated in proportion to a communication amount when content is transmitted to the communication device, wherein when the measured amount of cumulative information exceeds a given limit value, the RTT measurement unit measures the round trip time, the RTT judgment unit performs the determination of whether the round trip time exceeds the predetermined upper limit value, and the measured amount of cumulative information is reset if the round trip time does not exceed the predetermined upper limit value;
   a cumulative information storage unit configured to store the measured amount of cumulative information in a nonvolatile memory; and
   a cumulative information management unit configured to control to store the cumulative information in the cumulative information storage unit at a write frequency which is lower than the frequency at which the limit value judgment unit measures the amount of cumulative information.

2. The information-processing device of claim 1, wherein the cumulative information includes at least one of cumulative time, cumulative data amount of the content, and a frequency of events occurring during transmission of the content.

3. The information-processing device of claim 1, wherein the RTT measurement unit is configured to remeasure the round trip time when the round trip time exceeds the predetermined upper limit value.

4. The information-processing device of claim 3, wherein the cumulative information management unit is configured to reset the amount of cumulative information when the remeasured round trip time is not greater than the predetermined upper limit value.

5. The information-processing device of claim 1, further comprising: a write frequency controller configured to determine a frequency of writing cumulative information to the cumulative information storage unit based on a bit rate of content to be transmitted to the communication device, a durable write frequency of the cumulative information storage unit, an expected lifetime of the cumulative information storage unit, a number of communication devices receiving content at the same time, and a frequency of measuring the cumulative information, wherein the cumulative information management unit stores the cumulative information in the cumulative information storage unit at the frequency of writing cumulative information.

6. The information-processing device of claim 5, wherein the write frequency controller is configured to determine the frequency of writing cumulative information based on $F = \text{Const.} \times LRS/(DW)$ wherein F is the frequency of writing cumulative information, Const. is a constant number, L is the expected lifetime of the cumulative information storage unit, R is the bit rate of content to be transmitted to the communication device, S is the number of communication devices receiving content at the same time from the information-processing device, D is the frequency of measuring the cumulative information, and W is the durable write frequency of the cumulative information storage unit.

7. The information-processing device of claim 1, further comprising: a remeasurement frequency controller configured to determine a frequency of remeasuring the round trip time based on the amount of cumulative information, a frequency of measuring the cumulative information, an average number of measuring the round trip time before obtaining the round trip time not greater than the predetermined upper limit value, and a bit rate of content to be transmitted to the communication device, wherein the RTT measurement unit is configured to remeasure the round trip time at the frequency of remeasuring the round trip time.

8. The information-processing device of claim 7, wherein the frequency controller is configured to determine the frequency of remeasuring the round trip time based on $G = CD/(QR)$ wherein G is the frequency of remeasuring the round trip time, C is the amount of cumulative information, D is the frequency of measuring the cumulative information, Q is the average number of measuring the round trip time before obtaining the round trip time not greater than the predetermined upper limit value, and R is the bit rate of content to be transmitted to the communication device.

9. A computer-readable storage medium having encoded thereon computer executable program instructions for communicating with a communication device, the computer executable program instructions that, when executed by a computer, cause the computer to perform:
   measuring a round trip time between the information-processing device and the communication device;
   determining whether the round trip time exceeds a predetermined upper limit value, and putting a restriction on the communication with the communication device if the round trip time exceeds the predetermined upper limit value;

acquiring an identification of the communication device when the round trip time is not greater than the predetermined upper limit value;

measuring an amount of cumulative information accumulated in proportion to a communication amount when content is transmitted to the communication device, wherein when the measured amount of cumulative information exceeds a given limit value, the round trip time is measured, it is determined whether the round trip time exceeds the predetermined upper limit value, and the measured amount of cumulative information is reset if the round trip time does not exceed the predetermined upper limit value; and storing the measured amount of cumulative information in a nonvolatile memory at a write frequency which is lower than the frequency at which the amount of cumulative information is measured.

10. The computer-readable storage medium of claim 9, wherein the cumulative information includes at least one of cumulative time, cumulative data amount of the content, and a frequency of events occurring during transmission of the content.

11. The computer-readable storage medium of claim 9, wherein the computer executable program instructions that, when executed by the computer, further cause the computer to remeasure the round trip time when the round trip time exceeds the predetermined upper limit value.

12. The computer-readable storage medium of claim 11, wherein the computer executable program instructions that, when executed by the computer, further cause the computer to reset the amount of cumulative information when the remeasured round trip time is not greater than the predetermined upper limit value.

13. The computer-readable storage medium of claim 9, wherein the computer executable program instructions that, when executed by the computer, further cause the computer to determine a frequency of writing cumulative information to a cumulative information storage unit based on a bit rate of content to be transmitted to the communication device, a durable write frequency of the cumulative information storage unit, an expected lifetime of the cumulative information storage unit, a number of communication devices receiving content at the same time, and a frequency of measuring the cumulative information; and instructions for storing the cumulative information in the cumulative information storage unit at the frequency of writing cumulative information.

14. The computer-readable storage medium of claim 13, wherein the frequency of writing cumulative information is determined based on $F=\text{Const.} \times LRS/(DW)$ wherein F is the frequency of writing cumulative information, Const. is a constant number, L is the expected lifetime of the cumulative information storage unit, R is the bit rate of content to be transmitted to the communication device, S is the number of communication devices receiving content at the same time from the information-processing device, D is the frequency of measuring the cumulative information, and W is the durable write frequency of the cumulative information storage unit.

15. The computer-readable storage medium of claim 9, wherein the computer executable program instructions that, when executed by the computer, further cause the computer to determine a frequency of remeasuring the round trip time based on the amount of cumulative information, a frequency of measuring the cumulative information, an average number of measuring the round trip time before obtaining the round trip time not greater than the predetermined upper limit value, and a bit rate of content to be transmitted to the communication device; and remeasuring the round trip time at the frequency of remeasuring the round trip time.

16. The computer-readable storage medium of claim 15, wherein the frequency of remeasuring the round trip time is determined based on $G=CD/(QR)$ wherein G is the frequency of remeasuring the round trip time, C is the amount of cumulative information, D is the frequency of measuring the cumulative information, Q is the average number of measuring the round trip time before obtaining the round trip time not greater than the predetermined upper limit value, and R is the bit rate of content to be transmitted to the communication device.

17. An information-processing method for communicating with a communication device, comprising:

measuring a round trip time between the information-processing device and the communication device;

determining whether the round trip time exceeds a predetermined upper limit value, and putting a restriction on the communication with the communication device if the round trip time exceeds the predetermined upper limit value;

acquiring an identification of the communication device when the round trip time is not greater than the predetermined upper limit value;

measuring an amount of cumulative information accumulated in proportion to a communication amount content is transmitted to the communication device, wherein when the measured amount of cumulative information exceeds a given limit value, the round trip time is measured, it is determined whether the round trip time exceeds the predetermined upper limit value, and the measured amount of cumulative information is reset if the round trip time does not exceed the predetermined upper limit value; and storing the measured amount of cumulative information in a nonvolatile memory at a write frequency which is lower than the frequency at which the amount of cumulative information is measured.

* * * * *